Jan. 28, 1964    H. F. SWANSON    3,119,530
KETTLE ELEVATING MECHANISM
Filed Dec. 30, 1960    3 Sheets-Sheet 1

Inventor
Herbert F. Swanson
by Roberts, Cushman & Grover
Attys

INVENTOR.
Herbert F. Swanson
BY Roberts, Cushman & Grover
ATT'YS

Jan. 28, 1964 H. F. SWANSON 3,119,530
KETTLE ELEVATING MECHANISM
Filed Dec. 30, 1960 3 Sheets-Sheet 3

INVENTOR.
Herbert F. Swanson
BY
Roberts, Cushman & Grover
ATT'YS

United States Patent Office 3,119,530
Patented Jan. 28, 1964

3,119,530
KETTLE ELEVATING MECHANISM
Herbert F. Swanson, Belmont, Mass., assignor to Market Forge Company, Everett, Mass., a corporation of Massachusetts
Filed Dec. 30, 1960, Ser. No. 79,750
3 Claims. (Cl. 222—166)

This invention relates to kettles of the kind disclosed in my pending application Serial No. 812,501, now Patent No. 3,068,912, filed May 11, 1959, and more especially to improved elevating mechanism therefor.

The principal object of the invention is to provide an elevating mechanism of the kind disclosed in the aforesaid application, which embodies positive elevation and depression, smooth operation, precise positioning, and a mechanical advantage which combines ease of operation and relatively fast movement from one extreme position to the other, together with a somewhat simpler structure which is easier to assemble, less expensive to manufacture and requires less maintenance.

As herein illustrated, the kettle is pivotally supported on a shaft for tilting movement upwardly and forwardly about a horizontal axis, from an upright position to a position on one side, and there is elevating mechanism comprising a rigid lever pivotally mounted at one end for pivotal movement about a horizontal axis situated below and parallel to the axis of the shaft supporting the kettle. The underside of the kettle has contact with the elevating lever close to the pivot which provides a maximum mechanical advantage at the outset and the pivots for the kettle and lever are so situated that the ratio of the lifting force applied to the kettle by the lever and the resistance couple of the kettle to elevation are maintained substantially uniform throughout movement of the kettle. To facilitate relative movement of the lever and kettle a roller is mounted on the underside of the kettle for rolling contact with the lever and to maintain constant engagement of the lever and kettle guides are provided in association with the roller for engagement with the lever to hold the roller engaged therewith. The means for elevating the lever is a screw mounting a threaded sleeve, the latter being pivotally connected to one end of an arm, the opposite end of which is rigidly connected to the pivoted end of the lever. The screw has a long lead so that it will hold the lever at any given elevation and is provided with a removable crank by means of which it may be rotated. For safety there is a ratch selectively operable to permit rotation of the screw in one direction and prevent the rotation in the other direction. A counterbalancing device may be connected to the lever to counterbalance a part of the weight of the kettle.

The invention will now be described in greater detail with reference to the accompanying drawings wherein.

Figure 1:
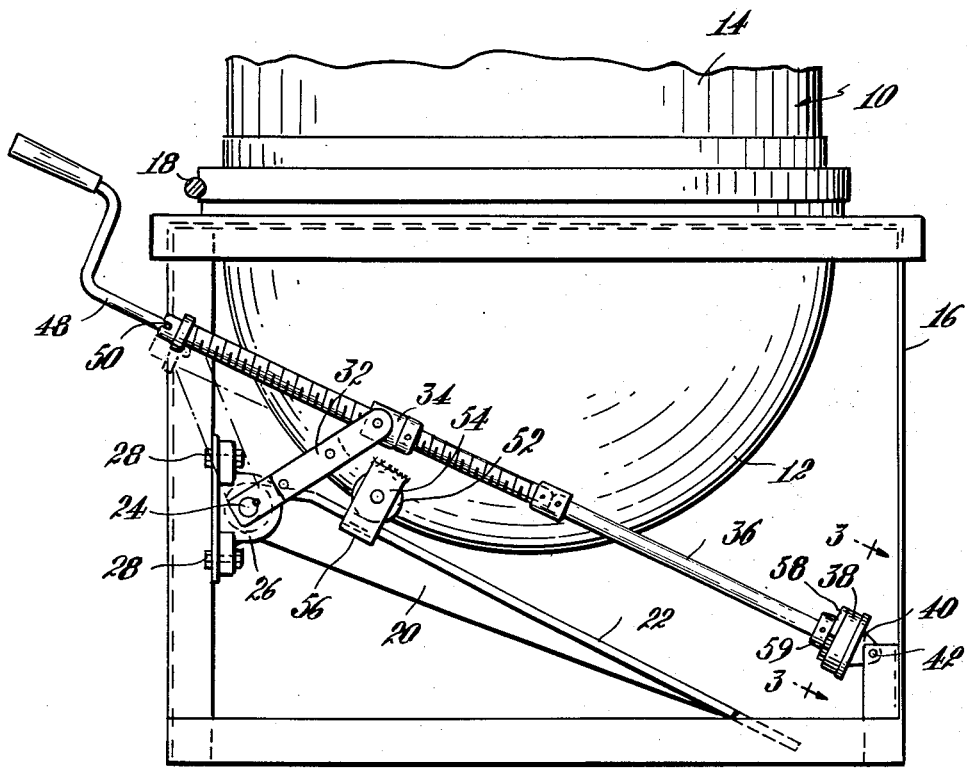
FIG. 1 is an elevation of a kettle supported for tilting movement about a horizontal axis at one side, showing the elevating mechanism with the elevating lever depressed to a position in which the kettle is upright.
Figures 2, 3, 4:
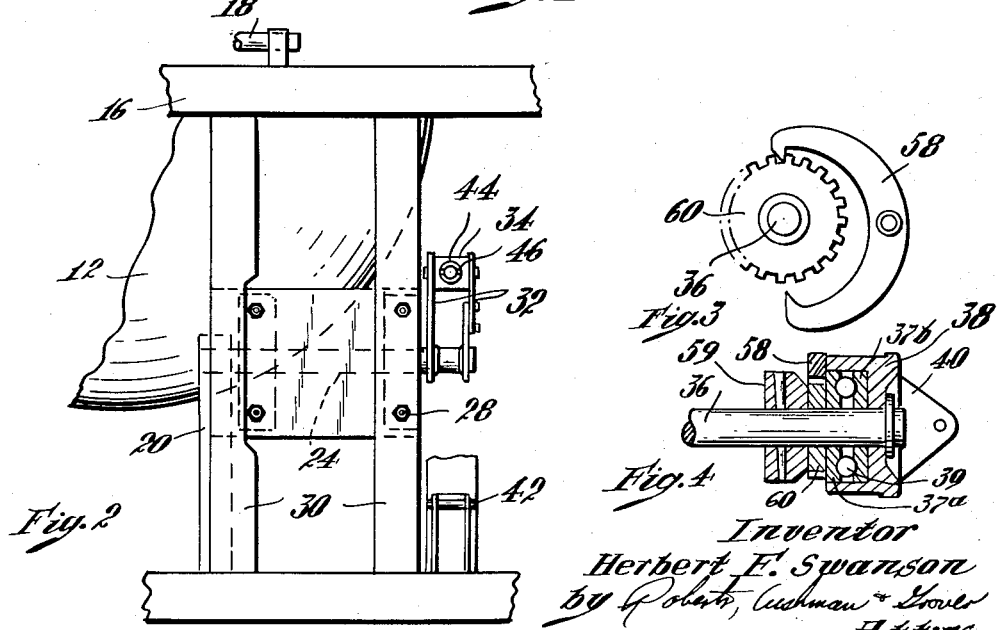
FIG. 2 is a fragmentary elevation as seen from the left-hand side of FIG. 1, with the handle of the elevating mechanism removed.
FIG. 3 is a detail showing a one-way ratch.
FIG. 4 is an axial section through the ratch.

Referring to the drawings, there is shown a kettle having a hemispherical lower portion 12 and a cylindrical upper portion 14 mounted within an opening at the top of a substantially rectangular supporting frame 16 for tilting movement upwardly and forwardly about a horizontal shaft 18 at one side, as disclosed in more detail in the aforesaid pending application.

The elevating mechanism, which forms the subject matter of this invention, comprises a rigid lever 20 having laterally disposed and longitudinally extending flanges 22—22 fastened at one end for pivotal movement to a horizontally disposed shaft 24 parallel to the shaft 18. The axis of the shaft 24 is situated below the axis of the shaft 18 which supports the kettle and at the same side and at such a level that the underside of the kettle has engagement with the lever when it is in its upright position close to the axis of the shaft 24. The shaft 24 is journaled in spaced, transversely disposed bearings 26—26, the latter being fastened by bolts 28 to upright 30—30 constituting part of the supporting frame 16. A pair of arms 32—32 are secured to the shaft 24 at an angle to the lifting lever 20 and between their distal ends is pivotally mounted an internally threaded sleeve 34. A screw 36 is engaged with the threaded sleeve 34. The lower end of the screw 36 is smooth and journaled in a bearing 38 pivotally supported by a bracket 40 near the base of the supporting frame 16. The bearing contains a pair of thrust plates 37a and 37b between which are disposed ball bearings 39. At its opposite or upper end the screw has an axial opening 44 and a diametrically disposed slot 46 for receiving an end of a crank 48, on the shank of which there is fixed a cross-pin 50 for engagement with the slot. The crank 48 provides means for rotating the screw and hence moving the arm 32 angularly with respect to the axis of the shaft 24, from the position shown in full lines in FIG. 1, to the position shown in dotted lines, and thereby to raise the arm 20.

By disposing the lever 20 in the position shown, that is, at the same side of the kettle as is the shaft 18 on which it tilts and with the underside of the kettle engaged with the lever close to the axis of the shaft 24, on which the lever is rocked, a maximum mechanical advantage is available for raising the kettle at the outset when the weight is the greatest. Furthermore, as thus disposed, as the point of engagement of the kettle moves outwardly along the lever from the axis of the shaft 24 during elevation of the kettle and the mechanical advantage becomes less, the center of weight of the kettle moves inwardly toward the axis of the shaft 18 and the rates of movement are such that the ratio of the lifting couple to the resistance couple is substantially the same throughout movement of the kettle so that the force required to turn the crank is substantially the same throughout movement of the kettle.

Elevation of the arm 20 will effect upward and forward movement of the kettle 10 about the shaft 18 and to facilitate such movement a roller 52 is mounted on the underside of the kettle between bracket arms 54, so as to have rolling contact with the upper side of the lever 20. To hold the roller engaged with the lever arm, throughout movement of the latter, so as to provide for positive elevation and depression, the bracket arms 54 have inwardly extending flanges 56—56, which slidably engage the underside of the flanges 22—22 at opposite sides of the lever arm 20.

To prevent accidental rotation of the screw in either direction as a result of the overbalancing effect of the weight of the kettle in one direction or the other, a collar 59 is pinned to the lower end of the screw adjacent the thrust plate 37a and between the collar and thrust plate there is disposed a ratchet wheel 60. A ratch 58 is pivotally supported on the bearing 38 so as to have engagement with the ratchet wheel. As thus constructed the ratch will allow the screw to be rotated in either direction, however, when the crank is released the weight of the kettle applies an end thrust to the screw which presses the collar against the ratch wheel and the ratch wheel against the thrust plate 37a, thereby creating sufficient friction so that the ratch wheel will not turn freely. Engagement of the ratch with the ratch wheel therefore frictionally resists free rotation of the screw.

The crank 48, as previously mentioned, is removable from the upper end of the screw so that it may be taken out when not required so as not to be in the way.

Figure 5:
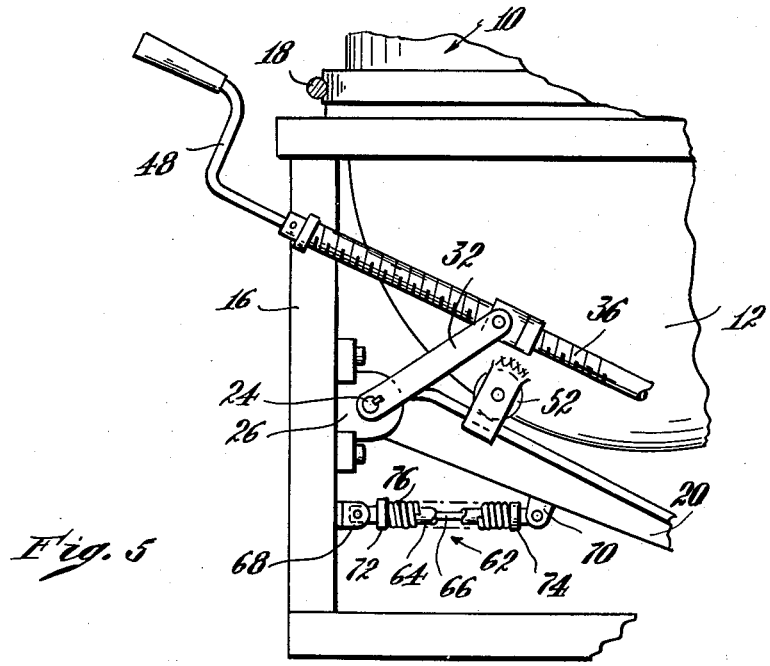
FIG. 5 is a fragmentary elevation showing a spring-type counterbalance for lessening the lifting force required to raise the kettle.
Figure 6:
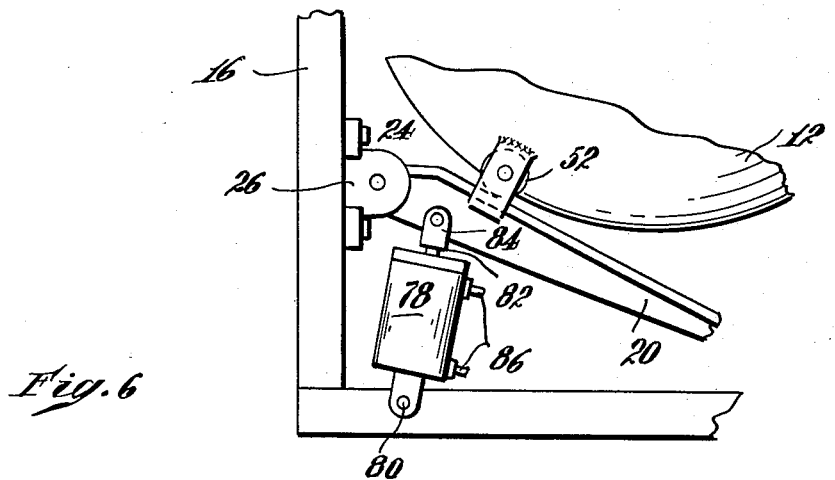
FIG. 6 is a fragmentary elevation showing a pressure-operated motor for raising the kettle.
Figure 7:
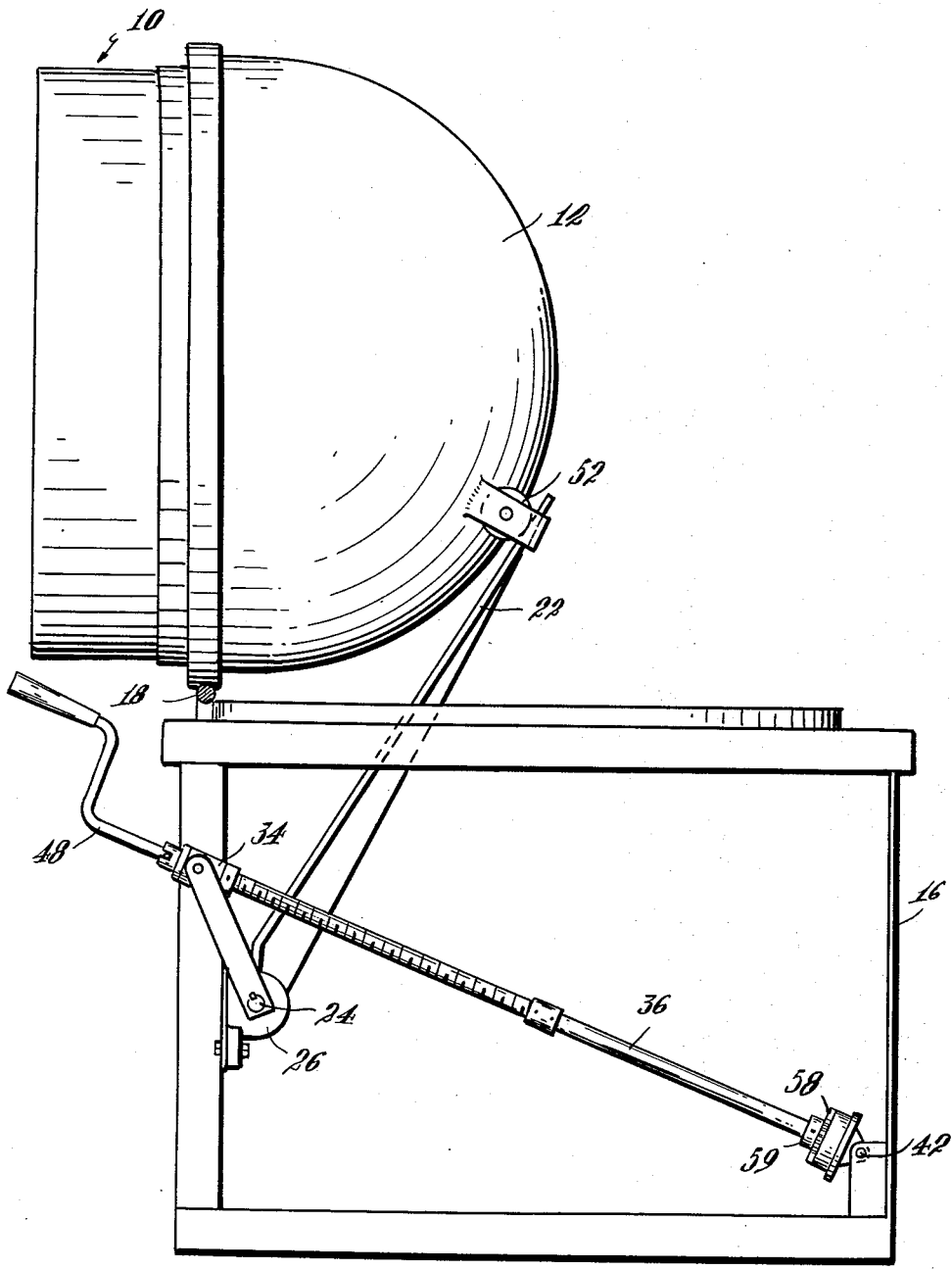
FIG. 7 is a view corresponding to FIG. 1, showing the kettle in an elevated position.

In order to lessen the force which has to be applied to the crank 48 to elevate the kettle a counterbalancing device 62 may be provided, as shown in FIG. 5. The counterbalance comprises a pair of telescoping elements 64 and 66, the remote ends of which are pivotally connected respectively to a bracket 68 on the base and a bracket 70 on the arm 20. Adjacent the pivoted ends of the telescoping members 64 and 66 there are fixed collars 72 and 74 and a compression spring 76 is disposed between these collars on the outer rod 64. The spring is designed to counterbalance a substantial amount of the weight of the kettle, thereby lessening to a considerable extent the force required to rotate the crank. The mechanical mechanism for raising the kettle shown in the preceding figures may be replaced by a pressure motor 78 (FIG. 6), pivotally connected at 80 to the frame and having a piston rod 82 protruding from its opposite end which is pivotally connected at 84 to the arm 20. Pressure fluid is supplied to the motor through conductors 86 at its opposite ends for effecting its operation.

It should be understood that the present disclosure is for the purpose of illustration only and that this invention includes all modifications and equivalents which fall within the scope of the appended claims.

I claim:

1. The combination with a kettle of a supporting frame, means pivotally connecting the kettle wall at one side, intermediate the top and bottom, to the top of the frame for pivotal movement about a horizontal axis which elevates the kettle bodily from the frame and simultaneously tilts it from a position in which the vertical axis of the kettle is perpendicular to a position in which it is horizontal, a shaft mounted on the frame below the axis of the pivotal means but above the bottom of the kettle when the latter is in its perpendicular position, said shaft being at the same side of the kettle as the pivotal means and parallel to the axis thereof, a lever fixed at one end to the shaft for effecting elevation and tilting of the kettle, said lever extending downwardly from the shaft beneath the bottom of the kettle and having a flat upper surface, a roller rotatably mounted on the bottom of the kettle, means for maintaining the flat upper surface of the lever and roller in tangential contact throughout elevation and tilting movement of the kettle and said lever, and said roller and lever being positioned relative to each other so that the roller moves outwardly away from the proximal end of the lever toward the distal end in proportion to the movement of the center of gravity of the kettle inwardly toward the axis of the means pivotally supporting it whereby the force required to effect movement of the kettle, throughout elevation and tilting, is substantially uniform, and means near the proximal end of the lever operative to effect movement thereof to raise and lower the kettle.

2. The combination with a kettle of a supporting frame, means pivotally connecting the kettle wall at one side, intermediate the top and bottom, to the top of the frame for pivotal movement about a horizontal axis which elevates the kettle bodily from the frame and simultaneously tilts it from a position in which the vertical axis of the kettle is perpendicular to a position in which it is horizontal, a shaft mounted on the frame below the axis of the pivotal means but above the bottom of the kettle when the latter is in its perpendicular position, said shaft being at the same side of the kettle as the pivotal means and parallel to the axis thereof, a lever fixed at one end to the shaft for effecting elevation and tilting of the kettle, said lever extending downwardly from the shaft beneath the bottom of the kettle and having a flat upper surface, a roller rotatably mounted on the bottom of the kettle, means for maintaining the flat upper surface of the lever and roller in tangential contact throughout elevation and tilting movement of the kettle and said lever, and said roller and lever being positioned relative to each other so that the roller moves outwardly away from the proximal end of the lever toward the distal end in proportion to the movement of the center of gravity of the kettle inwardly toward the axis of the means pivotally supporting it whereby the force required to effect movement of the kettle, throughout elevation and tilting, is substantially uniform, an arm fixed to the shaft at an acute angle to the lever, said arm being operative, by rotation about the axis of the shaft, to effect movement of the lever, an elongated screw supported at its ends on the frame for rotation without translation, a nut on the screw, said nut being pivotally connected to the distal end of the arm, and a handle on one end of the screw operative to rotate the screw.

3. The combination with a kettle of a supporting frame, means pivotally connecting the kettle wall at one side, intermediate the top and bottom, to the top of the frame for pivotal movement about a horizontal axis which elevates the kettle bodily from the frame and simultaneously tilts it from a position in which the vertical axis of the kettle is perpendicular to a position in which it is horizontal, a shaft mounted on the frame below the axis of the pivotal means but above the bottom of the kettle when the latter is in its perpendicular position, said shaft being at the same side of the kettle as the pivotal means and parallel to the axis thereof, a lever fixed at one end to the shaft for effecting elevation and tilting of the kettle, said lever extending downwardly from the shaft beneath the bottom of the kettle and having a flat upper surface, a roller rotatably mounted on the bottom of the kettle, means for maintaining the flat upper surface of the lever and roller in tangential contact throughout elevation and tilting movement of the kettle and said lever, and said roller and lever being positioned relative to each other so that the roller moves outwardly away from the proximal end of the lever toward the distal end in proportion to the movement of the center of gravity of the kettle inwardly toward the axis of the means pivotally supporting it whereby the force required to effect movement of the kettle, throughout elevation and tilting, is substantially uniform, a pressure-operative motor having a lug at one end and a piston rod protruding from the other end, means pivotally connecting the lug to the frame beneath the lever close to the side on which the lever is pivotally supported, and means pivotally connecting the piston rod to the lever close to the proximal end thereof.

References Cited in the file of this patent

UNITED STATES PATENTS

| | | |
|---|---|---|
| 1,399,351 | Lee | Dec. 6, 1921 |
| 1,889,520 | Anthony | Nov. 29, 1932 |
| 2,564,436 | Jackes et al. | Aug. 14, 1951 |
| 2,949,270 | Wood | Aug. 16, 1960 |

FOREIGN PATENTS

| | | |
|---|---|---|
| 475,814 | Italy | Nov. 19, 1952 |
| 531,332 | Italy | Aug. 1, 1955 |
| 949,137 | Germany | Sept. 13, 1956 |